Patented Feb. 19, 1946

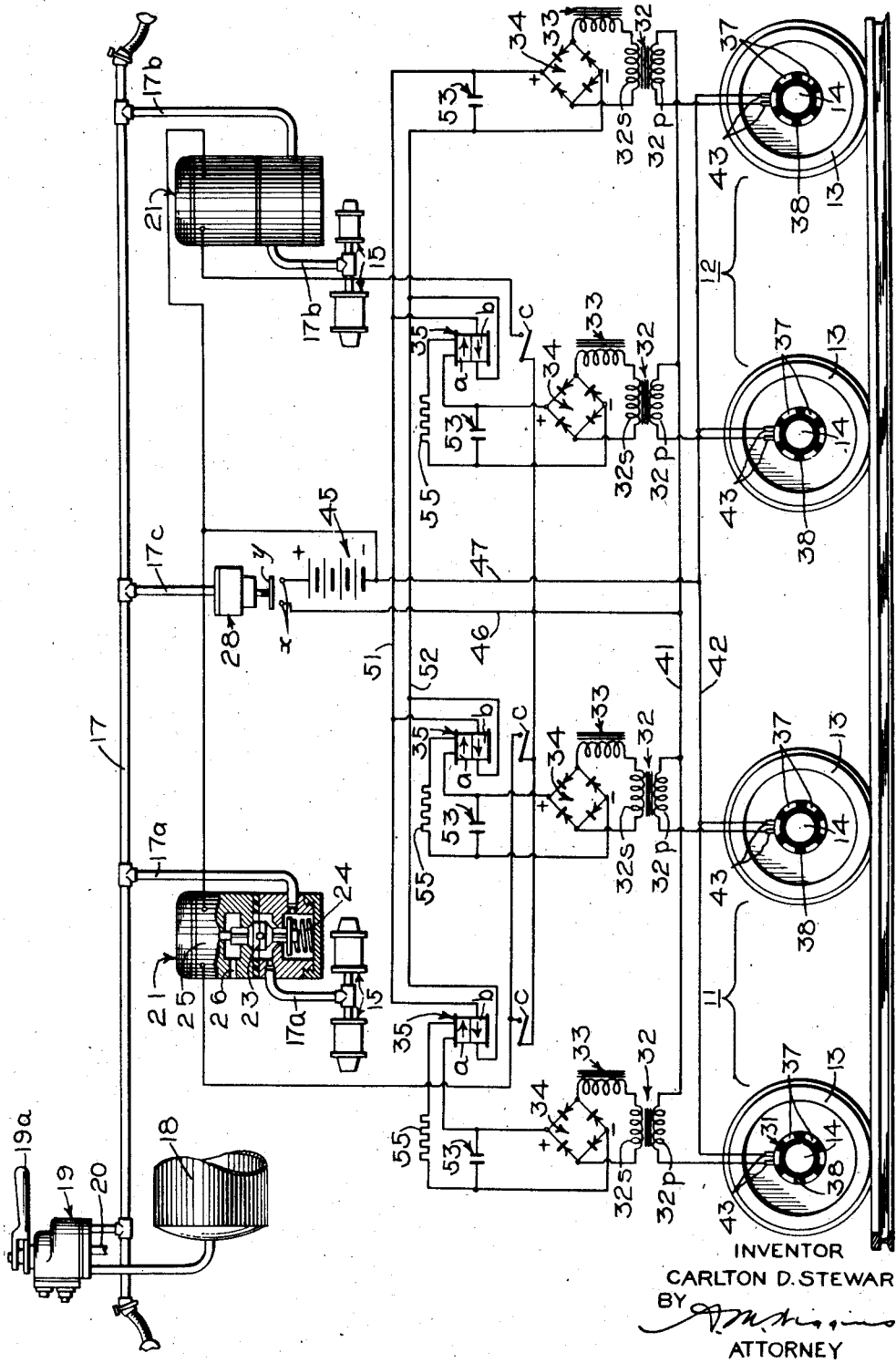

2,395,203

UNITED STATES PATENT OFFICE 2,395,203

SPEED DIFFERENTIAL DETECTING MEANS

Carlton D. Stewart, Wilkinsburg, Pa., assignor to The Westinghouse Air Brake Company, Wilmerding, Pa., a corporation of Pennsylvania Original application April 1, 1942, Serial No. 437,170. Divided and this application May 28, 1942, Serial No. 444,777

3 Claims. (Cl. 175—355)

This invention relates to speed differential detecting means and has particular relation to means for detecting a difference in the rotational speeds of two rotary elements, such as two wheels or wheel and axle units of a railway car, for a desired purpose, the present application being a division of my prior copending application Serial No. 437,170, filed April 1, 1942, and assigned to the same assignee as the present application.

Various types of devices, both mechanical and electrical in nature, are known and have been employed for detecting differences in the rotational speeds of two rotary elements for a desired indicating or control purpose such as maintaining a synchronous condition of the rotary elements. In the case of railway cars and trains, apparatus is known and has been proposed whereby to detect the difference in the rotational speed of a slipping and a non-slipping wheel or wheel unit whereby the brakes associated with the slipping wheel unit may be suitably controlled so as to prevent sliding thereof.

As is well known, the exertion of a braking effect on a vehicle wheel sufficient to exceed the limit of adhesion between the wheel and road surface or rail causes the wheel to decelerate at an abnormally rapid rate to a locked or nonrotative condition and slide. Sliding of wheels is objectionable, particularly in the case of railway car wheels, because sliding develops flat spots necessitating repair or replacement of the wheels. Moreover, the braking effect on the vehicle exerted through a sliding wheel is much less than that of a wheel which continues to roll.

As distinct from the term "sliding," the term "slipping" or "slipping condition" of a wheel refers to the rotation of a wheel at a speed different from a speed corresponding to vehicle speed at a given instant. A slipping condition of a vehicle wheel may be produced by the application of excessive braking force which causes the wheel to decelerate toward a locked condition, in which case the wheel rotates at a speed less than a speed corresponding to vehicle speed. On the other hand, a wheel may slip in response to the application of excessive propulsion torque, in which case the wheel rotates at a faster speed than a speed corresponding to vehicle speed.

It has been demonstrated that if the degree of application of the brakes associated with a wheel that begins to slip is rapidly and promptly reduced, the wheel will promptly cease to decelerate and at once accelerate at a rapid rate back toward a speed corresponding to vehicle speed without reducing in speed to a locked condition and sliding.

The wheels and axles of railway cars and trains are constantly subject to severe shock and vibration during travel of the car or train along the rails of the track due to rail joints, rail unevenness and other causes. It is essential therefore that mechanism directly associated with and responsive to the rotative condition of a wheel or wheel and axle unit be sufficiently sturdy and serviceable so as to withstand the constant shock and vibration to which it is subjected.

It is accordingly an object of my present invention to provide apparatus which is associated directly with the wheels or wheel and axle asemblies of railway cars and trains for the purpose of detecting the slipping condition of the wheels by a comparison of the speed of a slipping wheel and that of a non-slipping wheel, which apparatus is capable of withstanding the continued shock and vibration on the wheels or wheel units incidental to travel along the rails without frequent servicing—an essential requirement for railway service.

More specifically, it is an object of my invention to provide speed differential detecting means adapted to be associated with railway car wheels or wheel units and characterized by relatively light weight commutator devices and associated contact elements whereby to secure a measure of the rotational speed of the corresponding wheels or wheel units.

It is another object of my invention to provide apparatus suited for association with any two rotary elements, the speeds of which it is desired to compare, which apparatus is characterized by an arrangement for detecting the difference between the rotational speed of one rotary element and that of a second rotary element whether the speed of the said one rotary element is greater or less than that of the second rotary element.

The above objects, and other objects of my invention which will be made apparent hereinafter, are attained by an illustrative embodiment thereof shown in the single figure of the accompanying drawing.

Description

While the speed differential detecting apparatus which I have devised is suited for use in connection with any of a number of different situations or applications, I have for purposes of illustration shown it as applied to the control of fluid pressure brakes on a railway car or train.

In order to understand my invention and its uses, therefore, it will be necessary to describe briefly the nature of the fluid pressure brake control equipment.

In the drawing a simplified brake control equipment of the well-known straight-air type is shown in connection with a single car having two wheel trucks 11 and 12, respectively, located at opposite ends of the car. Each wheel truck, the structural details of which are omitted, comprises two wheel and axle units or assemblies, each unit having a pair of wheels 13 fixed at opposite ends of a connecting axle 14.

The brakes associated with the car wheels 13 may be of any suitable type such as the conventional clasp arranged shoes engaging the rim of the wheels and applied and released in response to the supply and the release respectively of fluid under pressure to one or more brake cylinders 15, two brake cylinders being illustratively shown for each wheel truck. In the case of one wheel truck, illustrated as the wheel truck 12, one of the brake cylinders is of smaller diameter than the other so that the braking effort exerted in response to a given fluid pressure in all the brake cylinders is less on the wheel unit with which the smaller brake cylinder is associated than on the other wheels or wheel units. The wheel unit with which the smaller brake cylinder is associated will accordingly hereinafter be referred to as the underbraked wheel unit. The reason for providing an underbraked wheel unit will be explained hereinafter.

The apparatus whereby fluid under pressure is supplied to the brake cylinders 15 and released therefrom may comprise a so-called control pipe 17, a reservoir 18 which is normally charged to a certain pressure such as one-hundred pounds per square inch by a fluid compressor not shown, a manually operated brake valve 19 of the self-lapping type, and a plurality of branch pipes 17a and 17b respectively connecting the control pipe 17 to the brake cylinders of wheel trucks 11 and 12, in each of which branch pipes a magnet valve device 21 is interposed for a purpose presently explained.

Brake valve 19 is of the well-known type described in detail and claimed in Patent 2,042,112 of Ewing K. Lynn and Rankin J. Bush and is therefore shown only in outline form and will here be but briefly described.

Brake valve 19 comprises a suitable self-lapping valve mechanism having a rotary operating shaft to which an operating handle 19a is fixed. In the normal or brake release position of the brake valve handle 19a, fluid under pressure is exhausted from the control pipe 17 to atmosphere through an exhaust port and pipe 20 at the brake valve. Upon displacement of the brake valve handle in a horizontal plane out of its brake release position into its so-called application zone, the exhaust communication just mentioned is closed and a supply communication is established through which fluid under pressure is supplied from the reservoir 18 to the control pipe 17. The nature of the self-lapping valve mechanism of the brake valve 19 is such that the pressure established in the control pipe 17 is substantially proportional to the degree of displacement of the brake valve handle out of its brake release position. The valve mechanism of the brake valve 19, moreover, possesses a pressure-maintaining feature for maintaining a pressure in the control pipe 17 corresponding to the position of the brake valve handle in the event that the pressure in the control pipe tends to reduce for any reason, such as leakage.

Each magnet valve device 21 is of a conventional double beat type having a double beat valve 23 which is urged into an upper seated position by a coil spring 24 and actuated to a lower seated position against the force of the spring 24 in response to energization of a magnet winding or solenoid 25.

In its upper seated position, the double beat valve 23 establishes communication from control pipe 17 through the corresponding branch pipe 17a or 17b to the corresponding brake cylinders 15. In its lower seated position, the double beat valve 23 closes communication through the corresponding branch pipe and establishes communication through which fluid under pressure is vented at a rapid rate from the corresponding brake cylinders through an exhaust port 26 in the magnet valve.

Thus, as long as the magnet winding 25 of each magnet valve device 21 is deenergized, the pressure in the corresponding brake cylinders 15 may be increased and decreased under the control of the operator in accordance with the increase or decrease of pressure in the control pipe 17. When the magnet winding 25 of each magnet valve 21 is energized, the fluid under pressure in the corresponding brake cylinders 15 is rapidly vented to atmosphere through the exhaust port 26 independently of the pressure in the control pipe 17.

A pressure responsive switch device 28 is also provided and is connected by a branch pipe 17c to the control pipe 17 so as to be responsive to the pressure in the control pipe.

Pressure switch 28 is preferably of a snap-acting type, such as shown in Patent 2,096,492 to Ellis E. Hewitt. Briefly, the pressure switch 28 comprises a pair of stationary insulated contacts $x$ and a movable contact $y$. As long as the pressure in the control pipe is less than a certain low value, such as five pounds per square inch, the movable contact $y$ is actuated to its open position out of engagement with the associated contacts $x$. When the pressure in the control pipe 17 increases above five pounds per square inch, the contact $y$ is actuated by snap-action into a closed position engaging the associated contacts $x$ and remains thereafter in such position as long as the control pipe pressure exceeds five pounds per square inch. When the pressure in the control pipe again reduces below five pounds per square inch, the contact $y$ is actuated by snap-action to open position out of engagement with the contacts $x$. The purpose of the pressure switch 28 will be made apparent hereinafter.

According to my present invention, I further provide wheel-slip detecting apparatus of the speed differential type for the purpose of controlling the magnet valve devices 21 in a manner to cause rapid venting of fluid under pressure from the brake cylinders in response to the occurrence of a slipping condition of the wheels of the corresponding truck.

The wheel-slip detecting apparatus which I provide comprises a commutator device 31 for each wheel unit, each commutator device being driven according to the rotational speed of the corresponding wheel unit in any suitable manner, as for example, by mounting it directly on the end of the axle within the journal casing in the manner indicated in the drawing. In addition, the wheel-slip detecting apparatus further comprises a transformer 32, an inductance device or choke coil 33, and a full-wave rectifier 34 for each wheel unit. Moreover, a relay 35 is further provided for each wheel unit except the underbraked wheel unit.

The commutator devices 31 may be of any suitable construction. As shown, they comprise a plurality of contact segments 37 suitably secured in spaced relation in a ring 38 of insulating material which is in turn secured to the end of the axle of a wheel unit or an extension thereof. Although I have for simplicity shown only six contact segments 37 for each commutator, it will be understood that in practice any desired number may be employed preferably more than six.

Each of the transformers 32 comprises a primary winding 32p and a secondary winding 32s. Each of the primary windings 32p is arranged to be alternately connected to and disconnected from a pair of bus wires 41 and 42 at a frequency proportional to the rotational speed of the corresponding wheel unit under the control of the corresponding commutator device 31. For this purpose, a pair of brushes 43 is suitably mounted in insulated fixed relation within the axle journal of each wheel unit for successive simultaneous engagement with the commutator contact segments 37. Each commutator device 31 and the associated pair of brushes 43 accordingly form a switch device which is connected in series relation with the corresponding primary winding 32p across the bus wires 41 and 42 to alternately make and break the circuit as the commutator device 31 rotates.

The bus wires 41 and 42 are energized by a suitable source of direct-current, such as a storage battery 45, under the control of the pressure switch 28. As shown, the bus wire 41 is connected by a branch wire 46 including the contacts of the pressure switch 28 to the positive terminal of the battery 45 only when the movable contact y of the pressure switch is in its closed position engaging the contacts x. The bus wire 42 is constantly connected by a wire 47 to the negative terminal of the battery 45.

Assuming that the pressure switch 28 is closed and that the voltage of the battery 45 is impressed across the bus wires 41 and 42, it will be seen that the primary winding 32p of each transformer 32 is alternately energized and deenergized at a frequency proportional to the rotational speed of the corresponding wheel unit.

The alternating voltage that is induced in the secondary winding 32s of each transformer 32 due to the alternate energization and deenergization of each corresponding primary winding 32p will not remain uniform in effective or root mean square value over the entire range of operating speeds but such variation thereof as does occur will not be materially adverse in effect with respect to the ultimate result that it is desired to obtain. The frequency of the alternating voltage induced in each of the secondary windings 32s will, however, vary in proportion to the rotational speed of the corresponding wheel unit.

The rectifier 34 may be of any suitable type, being illustrated as of the dry disk or copper-oxide type having two input terminals on which the voltage induced in the secondary winding 32s of the corresponding transformer is impressed, and two output terminals from which the rectified direct-current voltage is supplied.

An inductance device or choke coil 33 is interposed between one terminal of the secondary winding of each secondary winding 32s and the corresponding input terminal of the rectifier 34.

Each of the relays 35 is of the so-called bucking coil type having two separate windings a and b and a single front contact c.

The windings b of the relays 35 are connected in parallel relation across a pair of bus wires 51 and 52 which are in turn respectively connected to the positive and negative output terminals of the rectifier 34 associated with the underbraked wheel unit. A condenser 53 is connected across the output terminals of the rectifier 34 associated with the underbraked wheel unit in order to smooth out the ripple in the rectified or direct-current supplied from the rectifier.

The winding a of each of the relays 35 is connected in series relation with a suitable resistor 55 across the output terminals of the corresponding rectifier 34, a suitable condenser 53 being connected across the output of terminals of each rectifier 34 for smoothing out the ripples in the direct-current output of the rectifier.

The arrangement of the apparatus above described is such that the winding a of each relay 35 is energized by a current which is substantially inversely proportional to the rotational speed of the corresponding wheel unit over a wide range, such as fifteen miles per hour to eighty or ninety miles per hour, and that the winding b of each relay 35 is energized by a current which is substantially inversely proportional to the rotational speed of the underbraked wheel unit over a corresponding speed range.

The direction of flow of current through the windings a and b of each relay 35 is such that the windings exert opposing magnetomotive forces, as indicated by the oppositely directed arrow heads on the windings.

The resistors 55 are so designed as to adjust the current in the windings a to a value which is substantially equal to that in the winding b under normal conditions when all wheels are rotating at the same speed.

It will be apparent that the current energizing the windings a and b of the relays 35 is substantially inversely proportional to the rotational speed of the corresponding wheel unit over the wide range specified above by reason of the variation of the impedance of the inductance devices 33, in the alternating current circuit connecting the secondary winding 32s of each transformer to the input terminals of the rectifier 34, with variation in the frequency of the alternating current.

In view of the fact that the impedance of the inductance devices or choke coils 33 varies substantially in direct proportion to the frequency of the alternating current flowing therethrough, and also in view of the fact that such variation of the voltage supplied from the transformer secondary winding 32s as does occur with variation in the speed of rotation of the wheels is not materially adverse in effect, the voltage impressed on the input terminals of the rectifier 34 will vary substantially inversely with the rotational speed of the corresponding wheel unit over a wide range of operating speeds, such as from a speed of fifteen miles per hour upwards to eighty or ninety miles per hour. That is, the voltage impressed on the input terminals of each rectifier 34 will increase as the speed of the corresponding wheel unit decreases over such wide range of operating speeds. The voltage produced at the output terminals of each rectifier 34 will thus vary correspondingly. Accordingly, since the current in the output circuit of each rectifier varies directly with the output voltage of the rectifier it will be seen that the windings $a$ and $b$ of the relay 35 are energized by a current varying substantially inversely with the rotational speed of the corresponding wheel unit over the wide speed range specified above.

By reason of the fact that the windings $b$ of the relay 35 are energized over the wide speed range specified above by a current substantially inversely proportional to the rotational speed of the underbraked wheel unit, it will be seen that the windings $b$ are continuously energized during such time by a current which is substantially inversely proportional to the actual speed of the vehicle. Such is the case because the underbraked wheel unit is never braked sufficiently to cause a slipping condition thereof.

On the other hand, over the operating speed range specified above, the winding $a$ of each relay 35 is energized by a current which is substantially inversely proportional to the rotational speed of a corresponding wheel unit which may slip during a brake application. Accordingly, it will be seen that as long as each of the braked wheel units rotates at a speed substantially identical to that of the underbraked wheel unit the two windings $a$ and $b$ of each relay will exert substantially equal and opposite magnetomotive forces and consequently the contact $c$ of the relay will remain in its dropped-out position.

When one of the braked wheel units begins to slip, however, the current in the winding $a$ of the corresponding relay 35 instantly increases at a faster rate than the rate of increase of current in the winding $b$ due to the relatively rapid rate of deceleration of the slipping wheels with respect to the rate of deceleration of the underbraked wheel unit.

When a sufficient differential between the rotational speed of a slipping wheel unit and that of the underbraked wheel unit occurs, the magnetomotive force exerted by the winding $a$ of the corresponding relay predominates over that exerted by the winding $b$ of the corresponding relay and causes the contact $c$ of the relay to be actuated to its picked-up position. As long as a slipping wheel unit rotates at a speed more than a certain amount below that of the underbraked wheel unit, the contact of the relay 35 corresponding to the slipping wheel unit remains in its picked-up position.

The contacts $c$ of the two relays 35 for wheel truck 11 are connected in parallel relation in a circuit including the winding 25 of the magnet valve device 21 for wheeltruck 11 so as to severally control energization and deenergization of the magnet winding 25.

In a similar manner, the contact $c$ of relay 35 for the single braked wheel unit of wheel truck 12 is connected in series relation with the winding of the magnet valve device 21 for wheel truck 12 to control energization and deenergization thereof. The circuits of the magnet windings 25 of the two magnet valve devices 21 are sufficiently apparent in the drawing so that specific tracing of the circuits is deemed unnecessary.

*Operation*

Let it be assumed that the car having the equipment shown in the drawing is traveling under power with the brake valve handle 19a in its brake release position so that the brakes associated with the wheels 13 are released and that the operator desires to bring the car to a stop. To do so he first shuts off the propulsion power in the usual manner and then shifts the brake valve handle 19a out of its brake release position into its application zone an amount corresponding to the desired degree of brake application. Control pipe 17 and brake cylinders 15 are thus charged to a corresponding pressure and the brakes are applied on the wheels to a corresponding degree. At the same time the contacts of pressure switch 28 are actuated to closed position to cause energization of the bus wires 41 and 42. Thus current is supplied to the primary windings 32p of all the transformers 32 on the car only when the brakes are applied. The windings of the relays 35 are thus energized in substantially inverse relation to the speed of the corresponding wheel units as previously described.

As long as the wheels on the vehicle do not slip, no variation of the pressure in the brake cylinders 15 occurs except in accordance with variations of the pressure in the control pipe 17 as effected under the control of the operator by means of the brake valve 19. If, however, at the time an application of the brakes is initiated or at any time during a brake application, one or more of the braked wheel units other than the underbraked wheel unit begins to slip, a further operation occurs which will now be described.

Let it be assumed that the wheels of the left-hand wheel unit of truck 11 begin to slip while the brakes are applied. In such case, the contact $c$ of the corresponding relay 35 is picked-up causing energization of the magnet winding 25 of the magnet valve device 21 of wheel truck 11. The magnet valve device 21 is accordingly operated to close communication through the branch pipe 17a to the brake cylinders 15 of wheel truck 11 and also to cause fluid under pressure to be rapidly vented from these brake cylinders.

The venting of fluid under pressure from the brake cylinders 15 of wheel truck 11 causes a correspondingly rapid reduction in the degree of application of the brakes associated with the wheel units of truck 11 and consequently the wheels of the slipping wheel unit promptly cease to decelerate and begin to accelerate back toward a speed corresponding to vehicle speed without reducing in speed to a locked condition.

As previously indicated, the contact $c$ of a relay 35 remains in its picked-up position until the slipping wheel unit rotates at a speed less than a certain amount below that of the underbraked wheel unit. Consequently the magnet valve 21 continues to effect the venting of fluid under pressure from the brake cylinders 15 until the slipping wheel unit is restored substantially to vehicle speed, thus insuring the restoration of a slipping wheel unit to vehicle speed.

It will be understood that the degree of reduction of the pressure in the brake cylinders will vary depending upon the initial pressure in the brake cylinders at the time slipping of the wheel units begins as well as adhesion conditions between the wheel and rail or road surface. In any event, if a slipping wheel unit is not promptly restored substantially to vehicle speed, the venting of fluid under pressure from the corresponding brake cylinders continues. Thus, it is possible that the fluid under pressure in the brake cylinders may be completely vented or only partially vented depending upon the rapidity with which the slipping wheels are restored to vehicle speed.

When the slipping wheel unit approaches sufficiently close in speed to the rotational speed of the underbraked wheel unit, the magnetomotive forces exerted by the windings a and b of the relay 35 corresponding to the slipping wheel unit again become substantially balanced and the contact c of the relay 35 is thus restored to its dropped-out position. The magnet winding of the magnet valve device 21 for wheel truck 11 is thus deenergized and the magnet valve device restored to its normal condition cutting off the exhaust communication from the brake cylinders and reestablishing the supply communication thereto from the control pipe 17 through the corresponding branch pipe 17a.

Fluid under pressure is thus resupplied to the brake cylinders 15 of wheel truck 11 to cause reapplication of the brakes thereon, the degree of application of the brakes restored corresponding to the degree of pressure established in the control pipe 17. It will be apparent that due to the supply of fluid under pressure to the brake cylinders 15 on the wheel truck having the slipping wheel units the pressure in the control pipe 17 tends to reduce. However, due to the pressure-maintaining feature of the brake valve 19, fluid under pressure is automatically supplied to the control pipe 17 to compensate for the fluid supplied to the brake cylinders so that the pressure in the control pipe remains at a value corresponding to the position of the brake valve handle.

If, upon reapplication of the brakes on wheel truck 11 in the manner just described, the same wheel unit or the other wheel unit begins to slip, the above operation is repeated so that at no time are wheels permitted to decelerate to a locked condition and slide.

In the event that the braked wheel unit of wheel truck 12 other than the underbraked wheel unit begins to slip during a brake application, the corresponding relay 35 is picked-up to cause operation of the corresponding magnet valve device 21 to vent fluid under pressure from the brake cylinders 15 for that truck and a subsequent resupply of fluid under pressure thereto when the slipping wheel unit is restored substantially to the vehicle speed. This operation is identical to that described for the left-hand wheel unit of wheel truck 11 and is accordingly not repeated in detail.

When the car comes to a complete stop in response to the application of the brakes, relays 35 are always restored to their dropped-out position because of the cessation of supply of current to the windings a and b thereof. Accordingly, the magnet valve devices 21 are always restored to their normal positions when the car comes to a complete stop and thus the brakes are always applied on the car when the car comes to a complete stop as long as pressure is maintained in the control pipe 17.

When the operator desires to again start the car, he must, therefore, first release the brakes by restoring the brake valve handle 19a to its brake release position in which fluid under pressure is exhausted from control pipe 17 and the connected brake cylinders 15 to atmosphere through the exhaust port and pipe 20 at the brake valve.

Upon the reduction of the pressure in the control pipe 17 below five pounds per square inch, the contact y of the pressure switch 28 is restored to its open position, thereby deenergizing the bus wires 41 and 42 and consequently any of the primary windings 32p that may happen to remain connected across the bus wires through the corresponding commutator device 31 and associated brushes 43. In this connection, it will be apparent that the primary windings 32p of the transformers should be so designed as not to overheat during continuous energization occurring while the car is stopped with the brakes applied or, in the alternative, suitable thermally responsive cut-out switches should be provided for interrupting the circuit of the individual primary windings 32p. The pressure switch 28 also interrupts the circuit for the magnet windings 25 of the magnet valve devices 21 thereby insuring deenergization thereof.

It will be understood that while I have shown the equipment comprising my invention as applied only to a single car, such equipment may be employed on each car of a train. In the case of a train of cars, it is preferable to provide, in well known manner, suitable magnet valves on each car electrically controlled through train wires by a master controller on one car, such as the locomotive at the head end of the train, for effecting simultaneous variations of pressure throughout the length of the control pipe 17.

It will be apparent that while I have described my speed differential detecting apparatus particularly in connection with a brake control equipment wherein it detects the rotation of a braked wheel at a speed more than a certain amount less than that of the underbraked wheel or wheel unit, the apparatus is nevertheless suited for and may function to detect the rotation of a wheel at a speed more than a certain amount higher than that of the underbraked wheel or wheel unit, assuming that the battery circuit is closed, as by a suitably controlled switch paralleling the switch 28. Such rotation of a wheel might occur on railway cars where the wheels are driven by propulsion motors. It will be apparent that the application of propulsion torque to the wheels to a degree sufficient to exceed the limit of adhesion between the wheels and the rails will cause the wheels to slip or race, that is, rotate at a speed higher than the speed of the non-slipping or underbraked wheel.

In this situation, the contacts of the relays 35 are picked-up in response to the racing of the vehicle wheels, that is the rotation thereof at a speed higher than the speed of the underbraked wheel. It will be understood that in the case of propulsion, the underbraked wheel may be a wheel which is not subject to propulsion torque so that it will always rotate at a speed corresponding to vehicle speed.

It will be apparent that since the currents in the windings a and b of the relays 35 are substantially inversely proportional to the rotational speeds of the corresponding wheel units, the current in the winding a of the relays will be reduced sufficiently below that of the current in the winding b of the relays so the contact of the relays is actuated to its picked-up position due to the predominating effect of the current energizing the winding b of the relay. This is just the opposite of what occurs when the wheels slip during braking because in such case the winding a of the relay 35 exerts a predominating effect over the winding b.

While I have not shown any means associated with the relay 35 whereby the propulsion motors associated with driving wheels of a car may be controlled in response to the operation of the relays 35, such apparatus is well known. Moreover, such apparatus is not a part of my present invention which concerns the speed differential detecting apparatus per se.

Having now described my invention, what I claim as new and desire to secure by Letters Patent is:

1. Apparatus for detecting a predetermined differential in the rotational speeds of two rotary elements, said apparatus comprising a relay having two separate windings, means for supplying an alternating current voltage having a frequency substantially proportional to the rotational speed of one of said rotary elements, means for supplying an alternating current voltage having a frequency substantially proportional to the rotational speed of the other of said rotary elements, means for impressing a direct-current voltage on one winding of said relay which voltage is substantially inversely proportional to the frequency of the alternating current voltage supplied by the alternating current voltage supply means associated with said one rotary element, means for impressing a direct-current voltage on the other winding of said relay which voltage varies substantially inversely with the frequency of the voltage supplied by the alternating current voltage supply means associated with the said other rotary element, said windings being effective to exert substantially equal and opposite magnetomotive forces as long as the rotational speeds of the two rotary elements do not differ by more than a certain differential, one of said windings being effective to exert a magnetomotive force sufficiently predominating over that exerted by the other winding to cause pick-up of the relay only when the corresponding rotary element rotates at a speed less than that of the other rotary element by an amount exceeding said certain differential.

2. Apparatus for detecting a predetermined differential in the rotational speeds of two rotary elements, said apparatus comprising a relay having two separate windings, a first source for supplying an alternating current voltage having a frequency substantially proportional to the rotational speed of one of said rotary elements, a second source for supplying an alternating current voltage having a frequency substantially proportional to the rotational speed of the other of said rotary elements, a full-wave rectifier for each of said alternating current voltage sources, an inductance device for each of said rotary elements, the alternating current voltage source for each rotary element being associatively connected to the corresponding rectifier and inductance device in such a manner as to cause the rectifier to supply a direct-current voltage substantially inversely proportional to the rotational speed of the corresponding rotary element, the output voltage of the rectifier associated with said one rotary element being impressed on one winding of said relay and the output voltage of the rectifier associated with the other rotary element being impressed on the other winding of said relay whereby said windings are energized respectively by direct-current substantially inversely proportional to the rotational speed of the corresponding rotary element, said two windings exerting substantially equal and opposite magnetomotive forces as long as the rotational speeds of the two rotary elements do not differ by more than a certain amount and one of said windings being effective to exert a magnetomotive force sufficiently predominant over that exerted by the other winding to cause pick-up of the relay when the corresponding rotary element rotates at a speed more than a certain amount less than that of the other rotary element.

3. Apparatus for detecting a predetermined differential in the rotational speeds of two rotary elements, said apparatus comprising a source of direct-current, a transformer for each of said rotary elements having a primary winding and a secondary winding, a switch device associated with each rotary element effective to alternately connect the primary winding of the corresponding transformer to said direct-current source and disconnect it therefrom at a frequency proportional to the rotational speed of the corresponding rotary element, a full-wave rectifier for each rotary element having a pair of input terminals and a pair of output terminals, an inductance device for each of said rotary elements, the secondary winding of each of the transformers being connected across the input terminals of the corresponding rectifier in series relation with the corresponding inductance device, the arrangement being such that the direct-current voltage produced at the output terminals of each rectifier is substantially inversely proportional to the rotational speed of the corresponding rotary element, a relay having two separate windings one of which is subject to the output voltage of one of said rectifiers and the other of which is subject to the output voltage of the other of said rectifiers, said two windings exerting substantially equal and opposite magnetomotive forces as long as the two rotary elements rotate at substantially the same speed and one of said windings being effective to exert a magnetomotive force sufficiently predominant over that exerted by the other winding to cause pick-up of the relay only when the corresponding rotary element rotates at a speed more than a certain amount less than that of the other rotary element.

CARLTON D. STEWART.